(12) United States Patent
Chen et al.

(10) Patent No.: US 8,605,453 B2
(45) Date of Patent: Dec. 10, 2013

(54) ELECTRONIC DEVICE WITH DETACHABLE PRINTED CIRCUIT BOARD

(75) Inventors: Yun-Lung Chen, New Taipei (TW); Da-Long Sun, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 13/170,976

(22) Filed: Jun. 28, 2011

(65) Prior Publication Data

US 2012/0162943 A1      Jun. 28, 2012

(30) Foreign Application Priority Data

Dec. 24, 2010   (CN) .......................... 2010 1 0604387

(51) Int. Cl.
*H05K 5/00* (2006.01)
*H05K 7/00* (2006.01)

(52) U.S. Cl.
USPC ... 361/759; 361/679.02; 361/752; 312/223.1; 312/223.2

(58) Field of Classification Search
USPC ............ 361/759, 752, 679.01, 679.6, 679.02, 361/685, 683, 679.31, 679.32, 679.33, 724, 361/725, 726; 312/223.2, 223.1; 174/50, 174/520, 61, 559, 560, 561, 562
See application file for complete search history.

(56) References Cited

U.S. PATENT DOCUMENTS

| | | | | |
|---|---|---|---|---|
| 5,978,232 | A * | 11/1999 | Jo ................................. | 361/796 |
| 5,995,364 | A * | 11/1999 | McAnally et al. ....... | 361/679.31 |
| 6,055,152 | A * | 4/2000 | Felcman et al. ......... | 361/679.39 |
| 6,147,862 | A * | 11/2000 | Ho .......................... | 361/679.32 |
| 6,714,409 | B2 * | 3/2004 | Chen ........................ | 361/679.33 |
| 6,814,415 | B2 * | 11/2004 | Chen ......................... | 312/223.2 |
| 7,016,197 | B2 * | 3/2006 | Kirner .......................... | 361/752 |

* cited by examiner

*Primary Examiner* — Jinhee Lee
*Assistant Examiner* — Dimary Lopez
(74) *Attorney, Agent, or Firm* — Altis Law Group, Inc.

(57) ABSTRACT

An electronic device includes an enclosure, a printed circuit board, and a drive bracket. The enclosure includes a bottom wall. The printed circuit board is mounted on the bottom wall with a first fastener. The drive bracket is mounted on the bottom wall. The drive bracket shields a portion of the printed circuit board, the first fastener is located in the shielded portion of the printed circuit board. A through hole is defined in the drive bracket. The through hole is in alignment with the first fastener. The first fastener is accessible via the through hole.

16 Claims, 3 Drawing Sheets

ELECTRONIC DEVICE WITH DETACHABLE PRINTED CIRCUIT BOARD

BACKGROUND

1. Technical Field

The present disclosure relates to electronic devices, and more particularly to an electronic device which can be conveniently maintained.

2. Description of Related Art

Electronic devices, such as computers, often include a data processing unit and a display unit. The data processing unit often includes an enclosure, in which a plurality of electronic components, such as a printed circuit board, a data storage device, and a power supply are mounted. Usually, the enclosure is compact and the plurality of electronic components is crowded in the enclosure. For example, the data storage device often shields the printed circuit board. When the printed circuit board needs to be maintained, the data storage device needs to be detached first, which is inconvenient.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
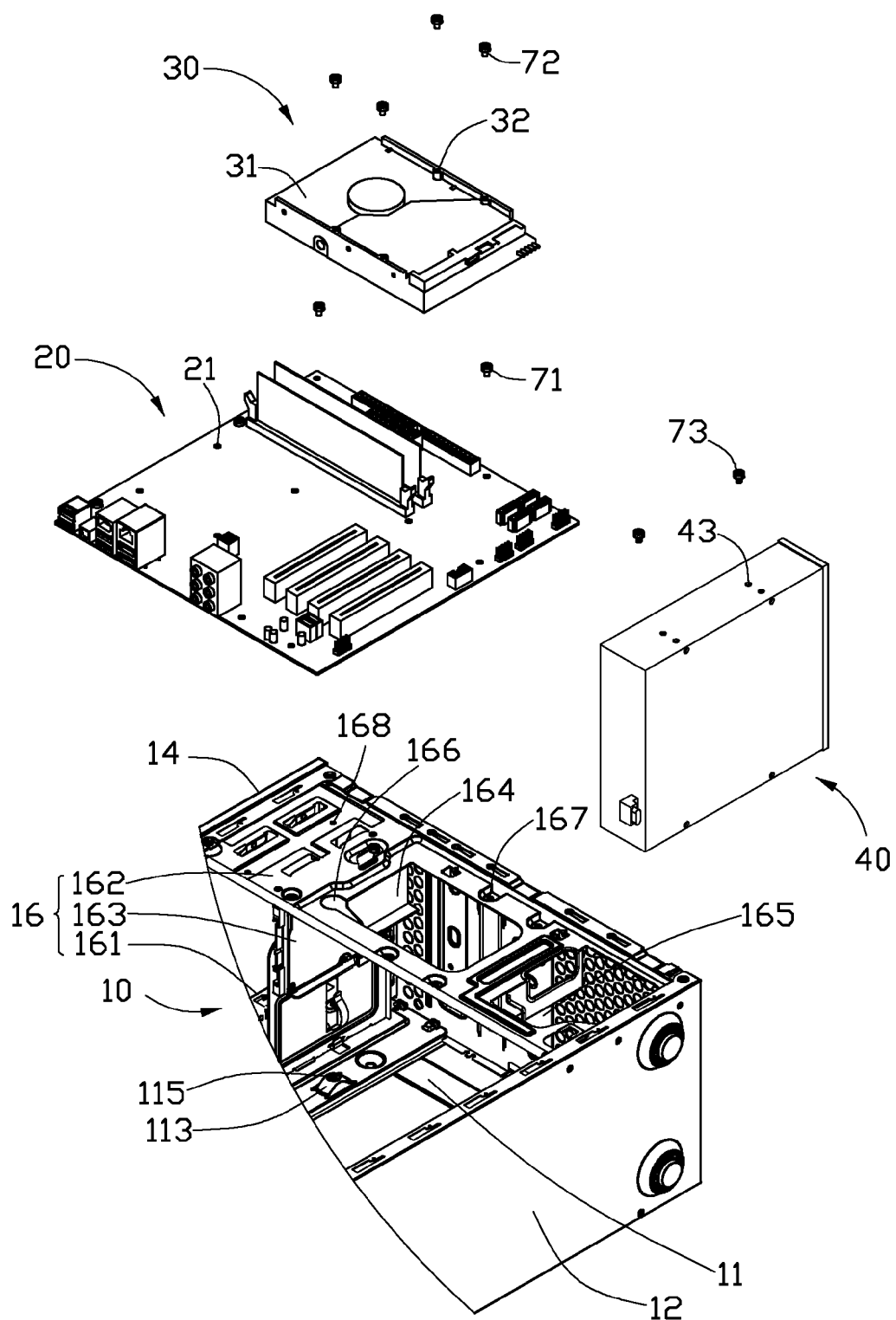
FIG. 1 is an isometric and exploded view of an embodiment of an electronic device.

Referring to FIG. 1, an electronic device in accordance with an embodiment includes an enclosure 10, a printed circuit board 20, a first data storage device 30, and a second data storage device 40. In one embodiment, the electronic device is a computer mainframe.

The enclosure 10 includes a bottom wall 11, a first side wall 12, and a second side wall 14. The first side wall 12 and the second side wall 14 are perpendicularly connected to opposite edges of the bottom wall 11.

A drive bracket 16 is mounted in the enclosure 10. The drive bracket 16 includes a first side piece 161, a second side piece 162, and a connection piece 163. The first side piece 161 is parallel to the second side piece 162. The connection piece 163 is perpendicularly connected between the first side piece 161 and the second side piece 162. The second side piece 162 is longer than the first side piece 161. The first side piece 161 is mounted on a part of the bottom wall 11. The second side piece 162 is mounted between the first side wall 12 and the second side wall 14. A plurality of third mounting holes 168 is defined in a portion of the second side piece 162 which is aligned with the first side piece 161. A second opening 165 is defined in another portion of the second side piece 162 which is adjacent the first side wall 12. A first opening 164 is defined between the second opening 165 and the plurality of third mounting holes 168. A plurality of second mounting holes 167 are defined around the first opening 164. A through hole 166 is defined in a corner of the first opening 164.

The bottom wall 11 forms a plurality of raised supports 113 for securing the printed circuit board 20 thereon. Each of the plurality of raised supports 113 defines a first mounting hole 115. One of the plurality of raised supports 113 is aligned with the through hole 166. A screwdriver can be inserted into the through hole 166 to access the raised support 113. Another one of the plurality of raised supports 113 is aligned with the second opening 165. The screwdriver can be inserted into the second opening 165 to access the raised support 113.

The printed circuit board 20 defines a plurality of first securing holes 21 corresponding to the first mounting holes 115 of the enclosure 10.

The first data storage device 30 can be mounted on the second side piece 162 of the drive bracket 16. The first data storage device 30 includes a mounting side 31. The mounting side 31 defines a plurality of second securing holes 32 corresponding to the second mounting holes 167 of the drive bracket 16.

The second data storage device 40 can be supported on the connection piece 163 of the drive bracket 16 and secured between the first side piece 161 and the second side piece 162. A plurality of third securing holes 43 is defined in a side of the second data storage device 40 corresponding to the third mounting holes 168 of the drive bracket 16.

Figure 2:
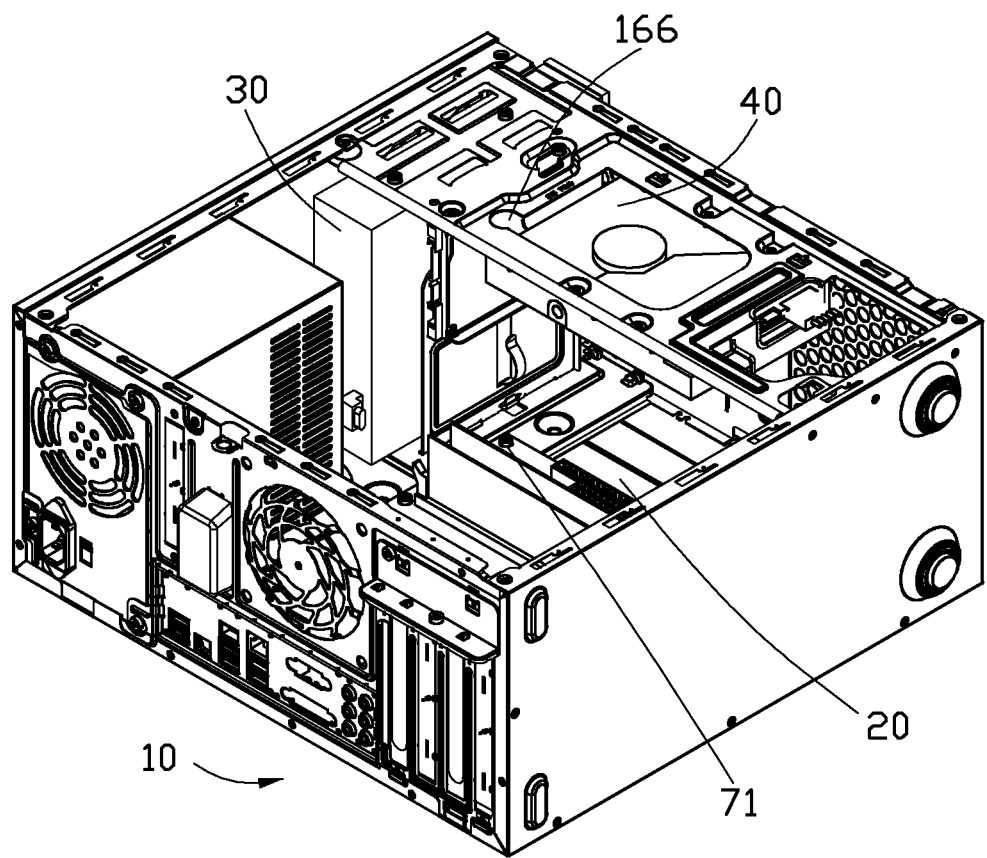
FIG. 2 is an isometric and assembled view of the electronic device of FIG. 1.
Figure 3:
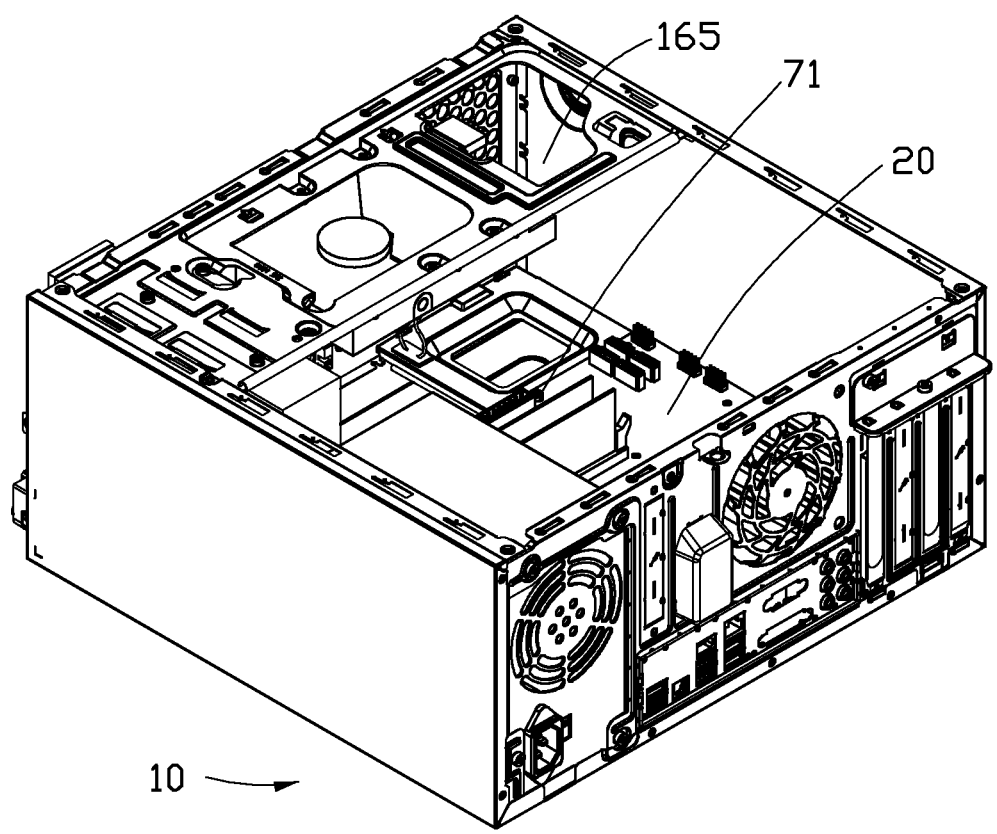
FIG. 3 is another isometric and assembled view of the electronic device of FIG. 1.

Referring to FIGS. 1 to 3, in assembly, the printed circuit board 20 is placed on the raised supports 113. The first securing holes 21 are aligned with the first mounting holes 115. A plurality of first fasteners 71 is secured in the first securing holes 21 and the first mounting holes 115 to mount the printed circuit board 20 in the enclosure 10. In this position, the driver bracket 16 shields a shielded portion of the printed circuit board 20. One of the plurality of first fasteners 71 is aligned with the through hole 166. Another one of the plurality of first fasteners 71 is aligned with the second opening 165.

The mounting side 31 of the first data storage device 30 abuts the second side piece 162. The second securing holes 32 are aligned with the second mounting holes 167. A plurality of second fasteners 72 is secured in the second securing holes 32 and the second mounting holes 167 to mount the first data storage device 30 on the drive bracket 16. In this position, the first data storage device 30 is aligned with the first opening 164 and does not shield the through hole 166. The first opening 164 assists the first data storage device 30 to dissipate heat.

The second data storage device 40 is placed on the connection piece 163 of the drive bracket 16. The third securing holes 43 are aligned with the third mounting holes 168. A plurality of third fasteners 73 is secured in the third securing holes 43 and the third mounting holes 168 to mount the second data storage device 30 in the drive bracket 16. Therefore, the electronic device is assembled.

In the above electronic device, both of the first data storage device 30 and the second data storage device 40 do not shield the first fasteners 71. A screwdriver can access the first fasteners 71 directly or via the through hole 166 or via the second opening 165. It is convenient to maintain the printed circuit board 20.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising: an enclosure comprising a bottom wall; a printed circuit board mounted on the bottom wall by a first fastener; a drive bracket comprising a first side piece, a second side piece and a connection piece, the first side piece mounted on the bottom wall, the connection piece is perpendicularly connected between the first side piece and the second side piece, the second side piece is parallel to the first side piece; a shielded portion of the printed circuit board shielded by the second side piece, the fastener located in the shielded portion of the printed circuit board, a through hole defined in the second side piece, the through hole in alignment with the first fastener, wherein the first fastener is accessible via the through hole.

2. The electronic device of claim 1, wherein the printed circuit board defines a first securing hole, the bottom wall defines a first mounting hole, and the first fastener is secured in the first securing hole and the first mounting hole.

3. The electronic device of claim 2, wherein the bottom wall comprises a raised support, the first mounting hole is defined in the raised support, and the printed circuit board is supported by the raised support.

4. The electronic device of claim 1, wherein the second side piece defines a first opening in communication with the through hole, a first data storage device is mounted on the second side piece, the first data storage device is aligned to the first opening and does not shield the through hole, and the first opening is adapted to assist the first data storage device to dissipate heat.

5. The electronic device of claim 4, wherein the second side piece defines a plurality of second mounting holes around the first opening, the first data storage device defines a plurality of second securing holes, the plurality of second securing holes is aligned to the second mounting holes.

6. The electronic device of claim 4, wherein the second side piece is longer than the first side piece.

7. The electronic device of claim 6, wherein the first data storage device is mounted on the second side piece and is parallel to the printed circuit board.

8. The electronic device of claim 7, wherein a second data storage device is mounted between the first side piece and the second side piece, and the second data storage device is located perpendicularly to the printed circuit board.

9. The electronic device of claim 1, wherein a second fastener is secured in the shielded portion of the printed circuit board, the second side piece defines a second opening which is aligned to the second fastener, and the second fastener is accessible via the second opening.

10. An electronic device, comprising: an enclosure comprising a bottom wall; a printed circuit board mounted on the bottom wall by a second fastener; a drive bracket comprising a first side piece, a second side piece parallel to the first side piece and a connection piece perpendicularly connected between the first side piece and the second side piece, the second side piece being longer than the first side piece, the first side piece mounted on the bottom wall, a shielded portion of the printed circuit board shielded by the second side piece, the second fastener located in the shielded portion, a second opening defined in the second side piece, the second opening in alignment with the second fastener; wherein the second fastener is accessible via the second opening.

11. The electronic device of claim 10, wherein the second side piece further defines a through hole, a first fastener is mounted in the shielded portion of the printed circuit board, the through hole is aligned to the first fastener, and the first fastener is accessible via the through hole.

12. The electronic device of claim 11, wherein the printed circuit board defines a plurality of first securing holes, the bottom wall defines a plurality of first mounting holes, and the first fastener and the second fastener are secured in the plurality of first securing holes and the plurality of first mounting holes.

13. The electronic device of claim 12, wherein the bottom wall comprises a plurality of raised supports, the plurality of first mounting holes is defined in the plurality of raised supports, and the printed circuit board is supported by the plurality of raised supports.

14. The electronic device of claim 11, wherein the second side piece defines a first opening in communication with the through hole, a first data storage device is mounted on the second side piece, the first data storage device is aligned to the first opening and does not shield the through hole, and the first opening is adapted to assist the first data storage device to dissipate heat.

15. The electronic device of claim 14, wherein the second side piece defines a plurality of second mounting holes around the first opening, the first data storage device defines a plurality of second securing holes, the plurality of second securing holes is aligned to the second mounting holes.

16. The electronic device of claim 10, wherein a second data storage device is mounted between the first side piece and the second side piece, and the second data storage device is located perpendicularly to the printed circuit board.

* * * * *